United States Patent
Müller et al.

[11] 3,797,232
[45] Mar. 19, 1974

[54] VEHICLE GAS TURBINES WITH RATIO COUPLINGS THEREBETWEEN-THEREFOR

[75] Inventors: Dieter Müller, Stuttgart; Wilhelm Jurisch, Nellingen Kr. Esslingen, both of Germany

[73] Assignee: Daimler-Benz Aktiengesellschaft, Stuttgart-Unterturkheim, Germany

[22] Filed: Apr. 5, 1973

[21] Appl. No.: 348,079

Related U.S. Application Data

[62] Division of Ser. No. 121,956, March 8, 1971, Pat. No. 3,744,241.

[30] Foreign Application Priority Data

Mar. 6, 1970  Germany............................ 2010581

[52] U.S. Cl............. 60/39.16 R, 74/DIG. 5, 74/661
[51] Int. Cl. ............................................... F02c 3/10
[58] Field of Search....................... 60/39.16, 39.14; 74/DIG. 5, 661

[56] References Cited
UNITED STATES PATENTS

| | | | |
|---|---|---|---|
| 3,546,879 | 12/1970 | Hass................................ | 60/39.16 R |
| 3,626,692 | 12/1971 | Kumm............................. | 60/39.16 R |
| 3,313,104 | 4/1967 | Evans et al...................... | 60/39.16 R |
| 3,488,947 | 1/1970 | Miller et al. .................... | 60/39.16 R |
| 3,237,404 | 3/1966 | Flanigan et al. ................ | 60/39.16 R |
| 3,266,248 | 8/1966 | Leslie.............................. | 60/39.16 R |
| 3,635,019 | 1/1972 | Kronogard et al............. | 60/39.16 R |

*Primary Examiner*—Carlton R. Croyle
*Assistant Examiner*—Warren Olsen
*Attorney, Agent, or Firm*—Craig and Antonelli

[57] ABSTRACT

Gas turbine unit for motor vehicles in which the compressor turbine is selectively connected to the output shaft through a controllable fluid coupling so as to provide a transfer of power to the output shaft from the compressor turbine during partial-load operation and a transfer of power from the output shaft to the compressor turbine during braking.

7 Claims, 4 Drawing Figures

VEHICLE GAS TURBINES WITH RATIO COUPLINGS THEREBETWEEN-THEREFOR

This is a division of application Ser. No. 121,956 filed Mar. 8, 1971, now U.S. Pat. No. 3,744,241.

The invention relates to a gas turbine unit for driving vehicles, especially motor vehicles, including a compressor, a compressor turbine and a power output turbine.

Usually such units are constructed in such a way that the compressor turbine mounted on the same shaft as the compressor serves exelusively for producing power for the compressor; whereas, the power for driving is derived exclusively from the power output turbine. The invention has the objective to improve the partial-load behavior of such gas turbine units and to make engine braking possible.

The invention consists therein, that the compressor turbine is clutchable, i.e., selectively connectable, with the power output shaft driven by the power output turbine. By this means, the specific fuel consumption during partial-load operation can be improved because then a part of the compressor turbine output can be transmitted to the power output shaft. Furthermore, an engine braking effect is obtained thereby since, through the connected compressor turbine, the compressor can pick up power and can thus absorb it.

In order to ensure that the transfer of energy is not only effective at reduced traveling speed and in order to obtain a constant brake action throughout a certain range, a speed reduction device can be provided in an especially favorable way between the compressor turbine and the power output shaft, which can be controlled for engine braking and regulated to a negative value and, for partial load driving, to a positive difference in rotating speed in relation to the power output turbine. By this means, it is assured, that power can be transferred from the compressor turbine to the power output shaft at all vehicle speeds; whereas, during engine braking, the braking effect is increased so that by the controllable difference in rotating speed, the compressor can be held at a high rotating speed, whereby its output for receiving energy may be fully utilized through a certain time span.

A favorable embodiment of the invention is obtained when, in the gear reduction between the power output turbine and the output shaft, a coupling half of a controllable fluid coupling is arranged, the other coupling halves of which being connected through a two-step controllable speed reduction mechanism with the compressor turbine. Through controlled filling of the fluid coupling and through change-over of the speed reduction mechanism, selection can be made as to whether the energy of the compressor turbine should be utilized for increasing the power of the output turbine or whether an increased engine braking effect should be attained. Appropriately, for the change-over of the speed reduction and for filling of the fluid coupling, a brake lever or the like and a partial-load regulator may be provided.

A structurally favorable embodiment of the invention is obtained when the speed reduction mechanism consists of a planetary gear, the outer rim of which is braked for partial-load driving; whereas, it is connected for engine braking through a freewheeling arrangement directly with one of the coupling halves. By this means the desired differences in rotating speed may be developed in a simple manner.

In the other embodiment of the invention the power output turbine may drive, aside from the power take-off shaft, two coupling halves of two controllable fluid couplings with different speed reductions, the assigned coupling halves of which are connected to the compressor turbine. By the selection as to which of the fluid couplings is to be put into operation, the desired positive or negative differences in rotating speed can be obtained with this embodiment without the requirement of switching to a mechanical speed reduction gear.

In a favorable manner, the coupling halves, driven by the compressor turbine, may be connected with each other to form with the assigned coupling halves, driven by the power output turbine, a double fluid coupling. Appropriately, for the control of the fluid couplings a brake lever or the like and a partial-load regulator are provided which control the degree of filling of the fluid couplings.

In order to ensure, with both structural arrangements, that the compressor turbine and the compressor are not subject to overspeed, it is especially advantageous when the fill quantity of the fluid coupling, during engine braking, is regulatable through a rotative speed limiter connected to the power output turbine.

It is an object of the present invention to improve the partial-load behavior of gas turbine units for vehicles.

It is another object of the present invention to improve the fuel comsumption during partial-load operation of a gas turbine unit for vehicles.

It is a further object of the present invention to achieve an engine braking effect in a gas turbine unit for vehicles.

It is still another object of the present invention to ensure an effective transfer of energy at reduced speeds between the compressor turbine and the output shaft in a gas turbine unit by means of a clutchable coupling therebetween.

It is still a further object of the present invention to provide for the transfer of power selectively in either direction between the compressor turbine and the output shaft of a gas turbine unit.

It is another object of the present invention to ensure that the compressor and compressor turbine of a gas turbine unit are not subject to overspeed.

These and other objects, features and advantages of the present invention will be more apparent from the following detailed description when taken in conjunction with the accompanying drawings, wherein.

Figure 1:
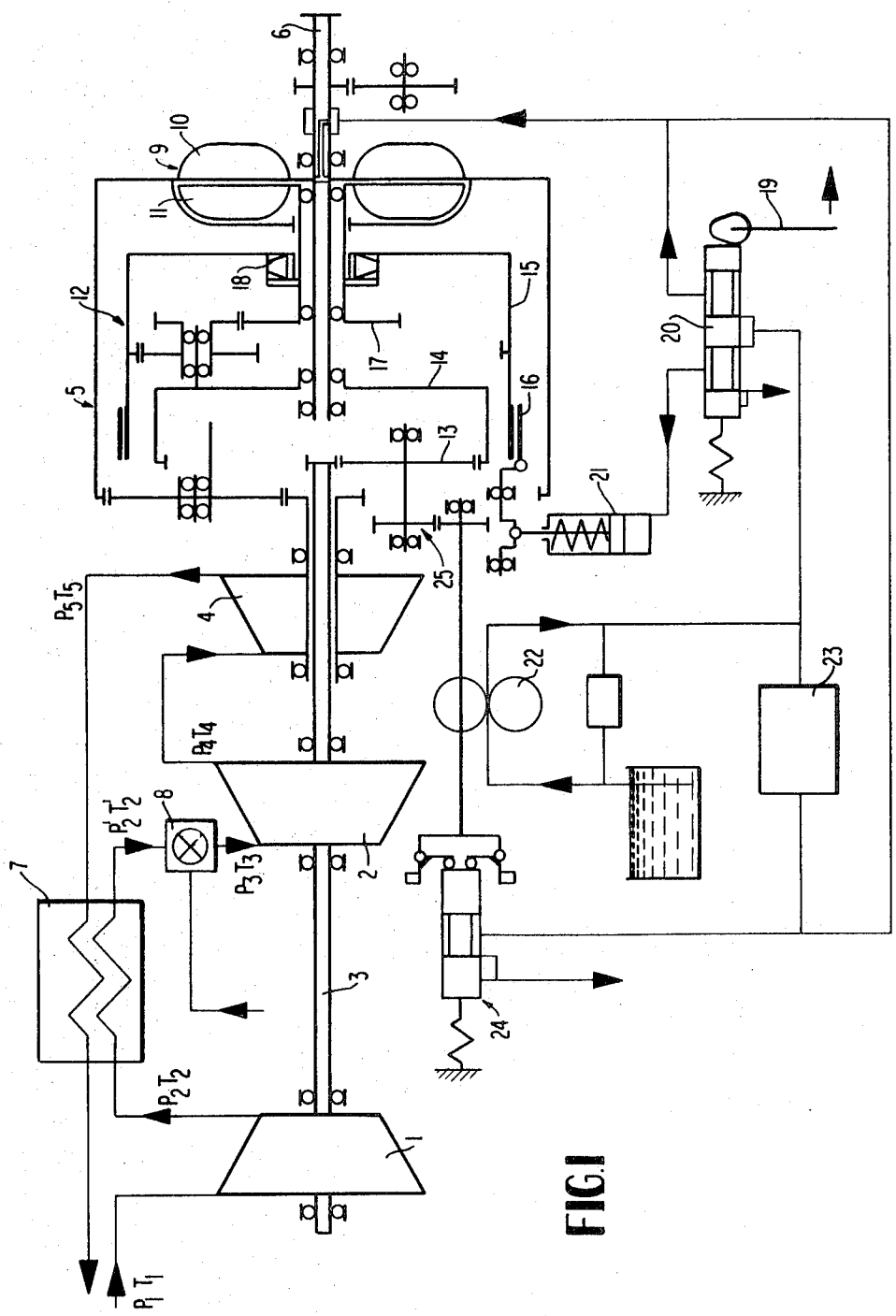
FIG. 1 shows a schematic diagram of one embodiment of a gas turbine unit in accordance with this invention.

The gas turbine unit shown in FIG. 1 essentially consists of a compressor 1 which, together with its compressor turbine 2 is mounted on a common shaft 3, and a work or power output turbine 4 which is connected to the output shaft 6 through a reduction gear 5. The gas is received by the compressor 1 at a pressure-temperature $P_1$, $T_1$ and is compressed to $P_2$, $T_2$. Passing through a heat exchanger 7, it is brought to the pressure-temperature condition $P_2'$, $T_2'$ and from there it is passed to a combustion chamber 8 in which it is brought to the pressure-temperature condition $P_3$, $T_3$. In this condition it is fed to the compressor turbine 2 where it expands to the pressure-temperature condition $P_4$, $T_4$. By this means, the required power for the compressor 1 is produced. Thereafter, the gas is fed to the output turbine 4 in which it expands to the pressure-temperature condition $P_5$, $T_5$ by giving up power (work). After this, it is discharged through the heat exchanger 7 to the atmosphere.

Usually with gas turbine units for vehicles, the rotary speed of the compressor 1 and the compressor turbine 2 as well as the output turbine is very high. For example, the compressor 1 and the compressor turbine 4 may be as high as 70,000 RPM, whereas the output turbine 4 may then rotate at about 50,000 RPM. The high rotating speed of the output turbine 4 usually has to be reduced at the output shaft 6. This is accomplished through a reduction gear mechanism 5.

In order to make it possible that the power of the compressor turbine 2 as well as the power of the output turbine 4 can be utilized, and to also obtain an engine brake effect, in accordance with the present invention the compressor turbine 2 is clutchably connectable with the output shaft 6. This is accomplished through a controllable fluid coupling 9, one half 10 of which is connected with the reduction gear 5 between the output turbine 4 and output shaft 6 and the other half 11 thereof is connected to the compressor or turbine 2 through a two-step reduction on mechanism 12. For this purpose, the shaft 3 of the compressor turbine 2 and the compressor 1 is extended and is connected with the clutch half 11 through a planetary gear. Step 14 of the planetary gear is driven by the shaft 3 of the compressor turbine via a gear 13, the outer rim 15 of which is held stationary by means of a band brake 16 and the inner rim 17 thereof is connected with clutch half 11. When the band brake 16 is released, the outer gear 15 is connected with the clutch half 11 through a freewheeling arrangement 18. Between the compressor turbine 2 and the coupling half 11, a two-step gear reduction 12 is provided which is selectively controlled in such a manner that the coupling half 11 connected to the compressor turbine 2 via the shaft 3 produces a positive or negative difference in rotative speed in relation to the coupling half 10 firmly connected to the output turbine 4. Depending on which operating requirements are desired, the gear reduction is operated and the fluid coupling 9 is filled. For partial-load driving, the band brake 16 is held closed so that the outer gear 15 of the planetary gear is held stationary and the coupling half 11 shows a positive difference in rotating speed in relation to the other coupling half 10. For engine braking, the band brake is released so that the coupling half 11 receives a negative difference in speed of rotation relative to the other clutch half through the outer gear 15 of the planetary gear and the freewheeling arrangement 18.

Filling of the fluid coupling 9 and the engaging and disengaging of the band brake 16 is accomplished at one time by means of a brake lever 19 or the like, which operates a servo-piston 20 which, on the one hand, acts on the band brake 16 through a power piston 21, and on the other hand, controls the filling of the fluid coupling 9.

During partial-load driving, oil is supplied by an oil pump 22 through a partial-load coupling regulator 23 of the fluid coupling 9 so that the compressor turbine 2 tramsmits power to the power output shaft 6 through a speed reduction 12.

For engine braking, oil from the oil pump 22 is supplied to the fluid coupling 9 through the servo-piston 20 whereas, at the same time, the band brake 16 is released so that the compressor 1, the compressor turbine 2 and the assigned speed reduction 12 may receive power.

In order to avoid overspeeding of the compressor 1 and compressor turbine 2 during engine braking, a revolution limiter 24 is provided which is connected through speed reduction steps 25 with shaft 3 of the compressor 1 and the compressor turbine 2. This rotating speed limiter 24 is arranged in the hydraulic regulating device in such a manner, that it reduces the fill quantity of the fluid coupling 9 supplied from the servo-piston 20 during engine braking corresponding to the required need.

Figure 2:
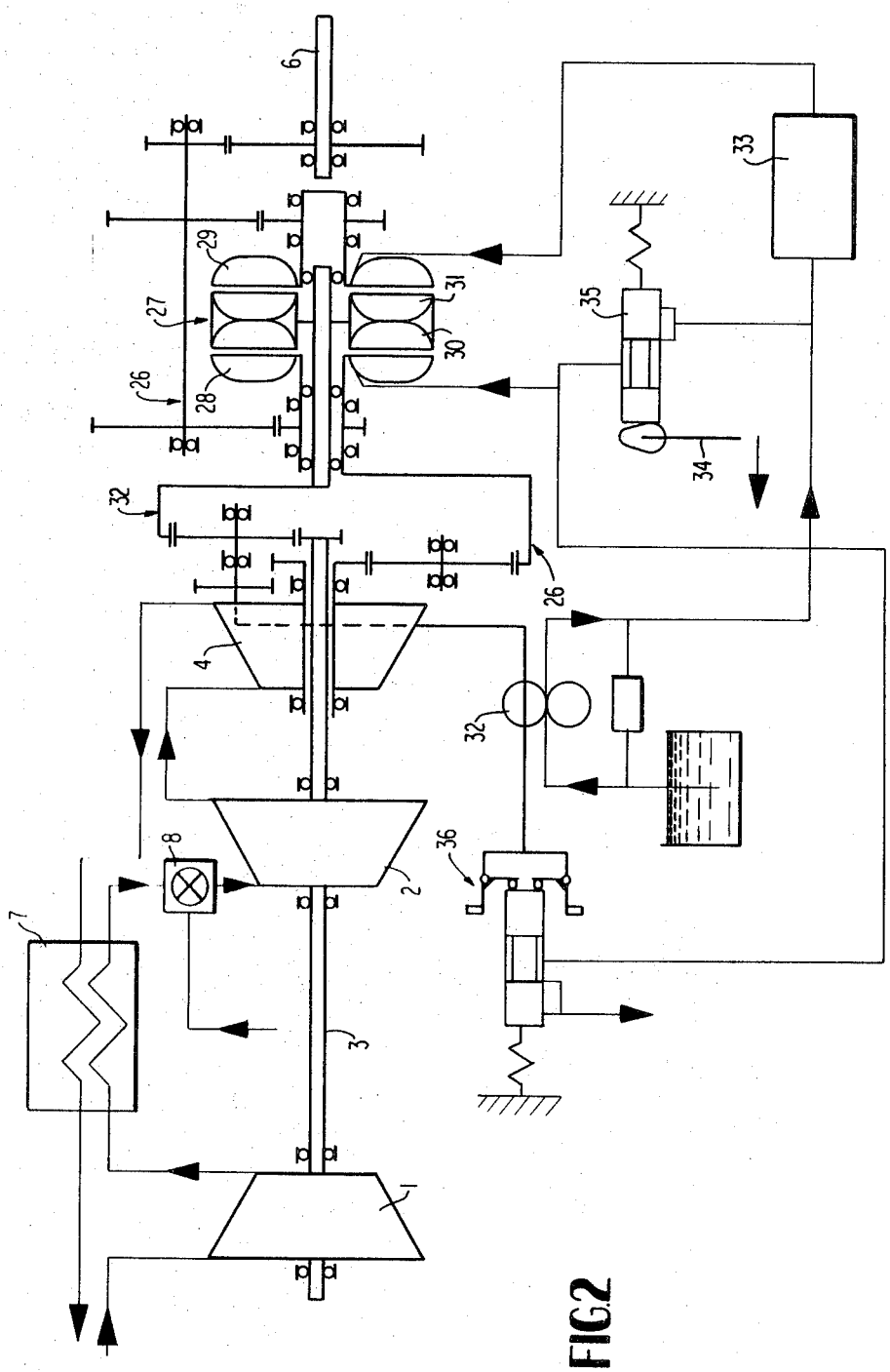
FIG. 2 is a schematic diagram of another embodiment of the invention.

The gas turbine unit according to FIG. 2 corresponds entirely in its thermodynamic arrangement with that of the gas turbine unit according to FIG. 1. The output turbine 4 drives the output shaft 6 through a gear reduction 26. In order to also provide a possibility here to clutch the output shaft 6 with the compressor turbine 2, a double fluid coupling 27 is provided. The two outer coupling halves 28 and 29 of the double fluid coupling 27 are built into the speed reduction 26 between output turbine 4 and output shaft 6 so that it may be driven from the output turbine 4 with different speeds of rotation. The two inner coupling halves 30 and 31 are fixedly connected with each other and are driven through a gear step 32 directly from shaft 3 extending beyond the compressor turbine 2 of the compressor 1 and compressor or turbine 2. The drive of the outer coupling halves 28 and 29 of the double fluid coupling 27 is accomplished in such a manner, that, in one of the embodiments, the right coupling half 29 shows a positive difference in rotating speed relative to the two inner coupling halves 30 and 31, whereas the left coupling half 28 receives a negative difference in rotating speed.

For partial-load driving, oil is supplied to the fluid coupling 29,31, shown to the right in the drawing, from an oil pump 32 through partial-load coupling regulator 33, which regulates in the same manner as the regulator 23 in the embodiment according to FIG. 1, the quantity of filling being regulated in dependence on the rotating speed of the compressor and the temperature in the combustion chamber. In this control position, the compressor turbine 2 may now transmit power to the output shaft 6.

For the engine braking process, a servo-piston 35 is operated through a brake lever 34 or the like which opens a connection between the oil pump 32 and the left fluid coupling 28, 30. By this means, the compressor turbine and also the compressor are connected with the output shaft. However, a negative difference of speed of rotation is obtained, controllable by the filling quantity, so that the compressor 1 must absorb power. Also in this embodiment of the invention, a speed limiter 36 is connected with the shaft of the compressor turbine which, in order to avoid overspeeding of the compressor 1 and compressor turbine 2, reduces the quantity of fluid allowed to flow through the servo-piston 35 to an acceptable value.

In both embodiments, the fluid couplings 9, 28, 30, 29 and 31 which are used empty themselves automatically when the supply of oil thereto is stopped.

Figure 3:
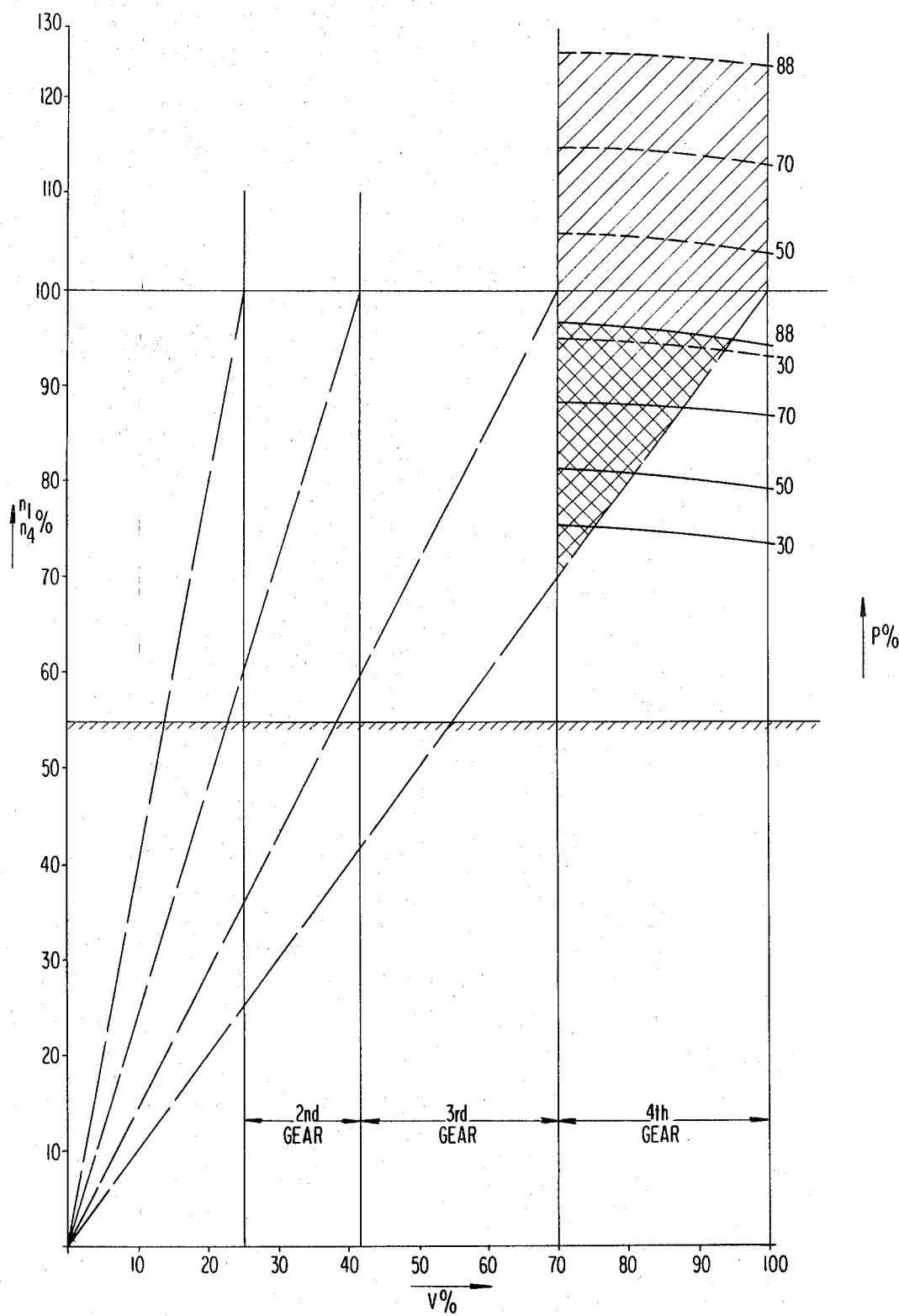
FIG. 3 is a diagram illustrating the transmittable power for a gas turbine unit, according to FIGS. 1 and 2.

FIG. 3 shows how, as in the gas turbine units according to FIGS. 1 or 2, it is possible to utilize power during partial-load driving in dependence on the driving speed. Above the speed of driving V in percent, which is subdivided into four steps, the speeds of rotation (rpm) n1 and n4 of the compressor 1 and the output turbine 4 are plotted also in percent. Furthermore, the net outputs P at various partial-load ranges are shown in the area of the fourth step. Among the various partial-load curves, the solid line shows which portion of the net power the compressor turbine 2 can take over when the compressor turbine 2 is connected with the output shaft 6 and the output turbine 4 at equal rotating speeds. The dashed lines show which share-distribution is possible when a positive difference in rotating speed at the fluid coupling 9 or 29, 31 between the compressor turbine 2 and the output turbine 4 exists. The cross-hatched portion of the diagram reveals that it is only possible when the output turbine and the compressor turbine are connected with the output shaft at the same speed, to transmit power from the compressor turbine to the output shaft at reduced speed of travel V. In contradistinction, the slanted shaded area reveals that with a positive difference of rotation, also at high speed of travel V and partial-load driving, power can be transmitted from the compressor turbine 2 without difficulty.

Figure 4:
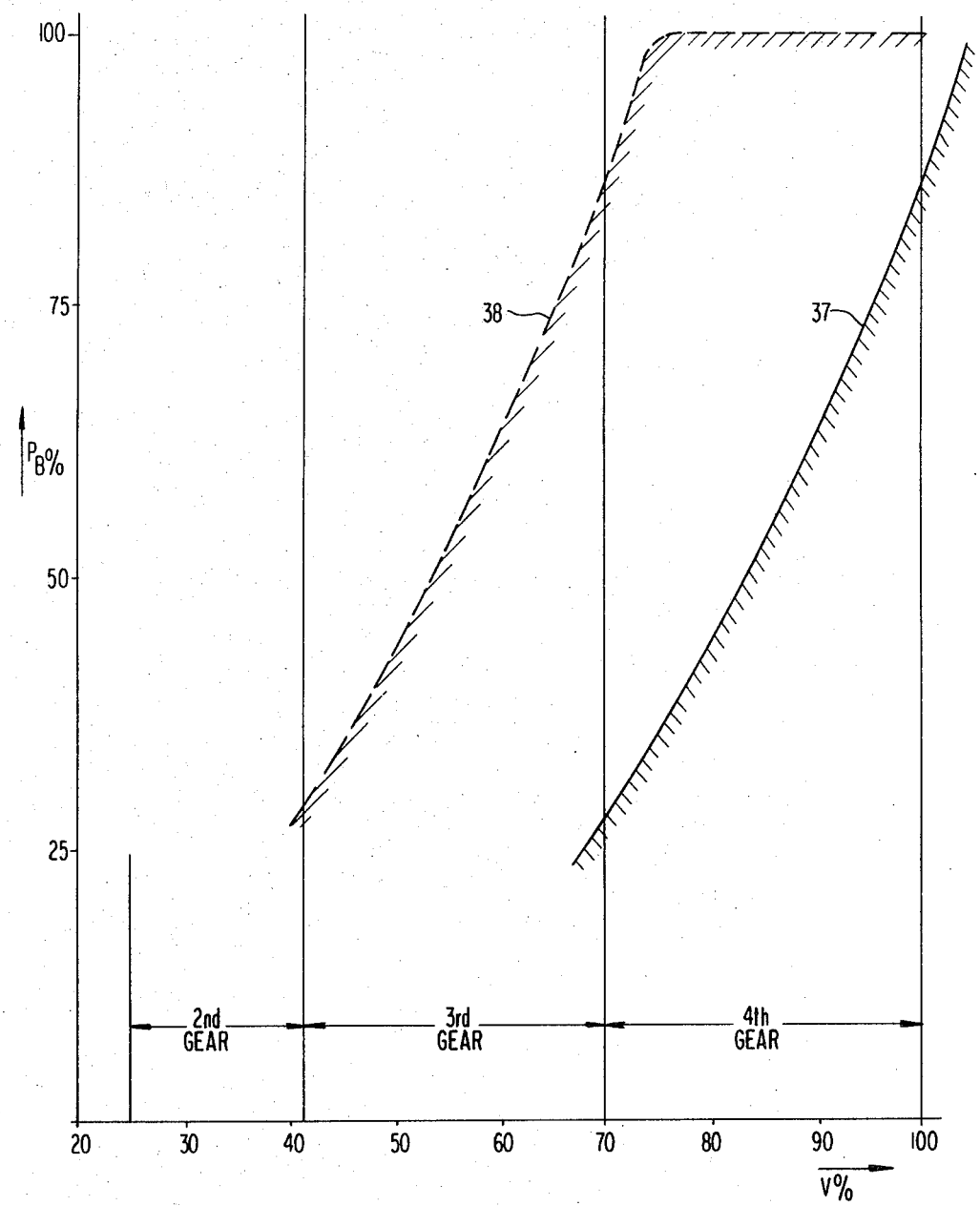
FIG. 4 is a diagram illustrating the attainable engine braking effect for a gas turbine unit according to FIGS. 1 and 2.

In FIG. 4, the brake energy PB of the compressor 1 in percent is plotted above the speed of travel V also in percent subdivided by steps. The solid curve 37 shows the energy the compressor can absorb for the case where the output shaft is connected to the compressor turbine at an equal rotating speed. It shows clearly that the brake energy PB drops off rapidly with the speed of travel so that a favorable braking can only be attained through a very small range of the speed of travel. The dashed curve 38 shows that the brake energy PB of the compressor may be raised considerably when a difference in rotating speed between the output shaft 6 and the compressor turbine 2 can be maintained whereby, through the regulation of the filling of the fluid coupling 9 or 28, 30, the maximal rotating speed of the compressor 1 may be maintained throughout a larger range in which its maximum power as engine braking energy PB can be reached. In this range, the braking energy PB of the compressor 1 amounts to close to 100 percent. The dropping off of the braking energy then takes place at considerably lower speeds of travel. In this case one has to shift into the next lower gear. The portion extending from the dashed curve 38 is based on the effect of the rotating speed limiter 24 or 36 which avoids overspeeding of the compressor 1. The difference in rotating speed in both directions is selected so that it amounts to 30 percent; whereby, during engine braking, the brake energy PB remains about constant over one step widths.

While we have shown and described two embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What we claim is:

1. In a gas turbine unit for the driving of vehicles, especially motor vehicles, including a compressor and a compressor turbine mounted to a drive shaft, and a power output turbine responsive to said compressor turbine for driving a power output shaft, the improvement comprising coupling means for selectively coupling said compressor turbine with said power output shaft to controllably transfer power therebetween, and speed reduction means provided between said compressor turbine and said output shaft which is controllable for engine braking to a negative difference and for partial-load driving to a positive difference in rotating speed relative to the speed of said output turbine, said coupling means including a controllable fluid coupling having one coupling part connected to said speed reduction means between said compressor turbine and said output shaft and another coupling part connected to said compressor turbine.

2. A gas turbine unit according to claim 1, wherein said another coupling part of said coupling means is connected to said compressor turbine through a two-step controllable speed reduction mechanism.

3. A gas turbine unit according to claim 2, including partial-load regulator means responsive to a brake instruction for controlling operation of said coupling means and said speed reduction mechanism.

4. A gas turbine unit according to claim 3, wherein said speed reduction mechanism includes a planetary gear, braking means for braking said planetary gear during partial-load operation, and freewheeling means coupling said planetary gear to said another coupling part.

5. A gas turbine unit according to claim 4, including speed limiter means connected to said compressor turbine for controlling the fluid supplied to said controllable fluid coupling during engine braking.

6. A gas turbine unit according to claim 1, including speed limiter means connected to said compressor turbine for controlling the fluid supplied to said controllable fluid coupling during engine braking.

7. A gas turbine unit according to claim 2, wherein said speed reduction mechanism includes a planetary gear, braking means for braking said planetary gear, braking means for braking said planetary gear during partial-load operation, and freewheeling means coupling said planetary gear to said another coupling part.

* * * * *